(12) United States Patent
Choi et al.

(10) Patent No.: US 11,956,442 B2
(45) Date of Patent: *Apr. 9, 2024

(54) METHOD FOR MIXED NAL UNIT TYPE SUPPORT IN A CODED PICTURE

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,467

(22) Filed: Jun. 28, 2022

(65) Prior Publication Data

US 2022/0329821 A1 Oct. 13, 2022

Related U.S. Application Data

(63) Continuation of application No. 17/077,035, filed on Oct. 22, 2020, now Pat. No. 11,399,188.

(Continued)

(51) Int. Cl.
*H04N 19/136* (2014.01)
*H04N 19/174* (2014.01)
(Continued)

(52) U.S. Cl.
CPC ......... *H04N 19/136* (2014.11); *H04N 19/174* (2014.11); *H04N 19/46* (2014.11); *H04N 19/70* (2014.11); *H04N 19/91* (2014.11)

(58) Field of Classification Search
None
See application file for complete search history.

(56) References Cited

U.S. PATENT DOCUMENTS 9,584,804 B2 * 2/2017 Wang ..................... H04N 19/70
9,648,322 B2 * 5/2017 Wang ..................... H04N 19/50
(Continued)

FOREIGN PATENT DOCUMENTS

WO 2020185922 A1 9/2020

OTHER PUBLICATIONS

Benjamin Bross et al., "Versatile Video Coding (Draft 6)", Joint Video Experts Team (JVET) of ITU-T SG 16 WP 3 and ISO/IEC JTC 1/SC 29/WG 11, 15th Meeting, JVET-O2001-vE, Jul. 3-12, 2019, 455 pages, Gothenburg, SE.

(Continued)

*Primary Examiner* — Reza Aghevli
(74) *Attorney, Agent, or Firm* — Sughrue Mion, PLLC

(57) ABSTRACT

Methods and systems are provided for decoding at least one video stream. A method includes receiving a first network abstraction layer (NAL) unit of a first slice of a coded picture and a second VCL NAL unit of a second slice of the coded picture, the first VCL NAL unit having a first VCL NAL unit type and the second VCL NAL unit having a second VCL NAL unit type that is different from the first VCL NAL unit type, and decoding the coded picture, the decoding including determining a picture type of the coded picture based on the first VCL NAL unit type of the first VCL NAL unit and the second VCL NAL unit type of the second VCL NAL unit, or based on an indicator, received by the at least one processor, indicating that the coded picture includes mixed VCL NAL unit types.

20 Claims, 7 Drawing Sheets

Related U.S. Application Data

(60) Provisional application No. 62/956,254, filed on Jan. 1, 2020.

(51) Int. Cl.
*H04N 19/46* (2014.01)
*H04N 19/70* (2014.01)
*H04N 19/91* (2014.01)

(56) References Cited

U.S. PATENT DOCUMENTS

| | | | | |
|---|---|---|---|---|
| 10,999,590 | B2* | 5/2021 | Choi | H04N 19/70 |
| 11,032,546 | B1* | 6/2021 | Krishnan | H04N 19/12 |
| 11,057,636 | B2* | 7/2021 | Huang | H04N 19/134 |
| 2014/0016697 | A1* | 1/2014 | Wang | H04N 19/573 375/240.12 |
| 2014/0016707 | A1* | 1/2014 | Wang | H04N 19/31 375/240.26 |
| 2015/0016546 | A1 | 1/2015 | Wang et al. | |
| 2015/0085917 | A1 | 3/2015 | Hendry et al. | |
| 2016/0234517 | A1 | 8/2016 | Samuelsson et al. | |
| 2020/0092577 | A1* | 3/2020 | Huang | H04N 19/52 |
| 2020/0092578 | A1* | 3/2020 | Huang | G06T 3/0075 |
| 2020/0169748 | A1* | 5/2020 | Chen | H04N 19/563 |
| 2020/0280736 | A1* | 9/2020 | Wang | H04N 19/463 |
| 2020/0381022 | A1* | 12/2020 | Ilola | G11B 27/102 |
| 2021/0092359 | A1* | 3/2021 | Nassor | H04N 19/184 |
| 2021/0092450 | A1* | 3/2021 | Choi | H04N 19/105 |
| 2021/0105492 | A1* | 4/2021 | Aksu | H04N 19/20 |
| 2021/0136396 | A1* | 5/2021 | Deshpande | H04N 19/70 |
| 2021/0194946 | A1* | 6/2021 | Hannuksela | H04N 21/8456 |
| 2021/0250617 | A1* | 8/2021 | Hannuksela | H04N 21/8455 |
| 2021/0281858 | A1* | 9/2021 | Hannuksela | H04N 19/176 |
| 2021/0297705 | A1* | 9/2021 | Sjöberg | H04N 19/70 |

OTHER PUBLICATIONS

Benjamin Bross et al., "Versatile Video Coding (Draft 7)", Joint Video Experts Team (JVET) of ITU-T SG 16 WP 3 and ISO/IEC JTC 1/SC 29/WG 11, 16th Meeting, JVET-P2001-vE, Oct. 1-11, 2019, 492 pages, Geneva, CH.
International Search Report dated Mar. 8, 2021, in International Application No. PCT/US2020/065318.
Written Opinion dated Mar. 8, 2021, in International Application No. PCT/US2020/065318.
Notification of reasons for refusal dated Oct. 11, 2022 from the Japanese Patent Office in Japanese Application No. 2021-559109.
Robert Skupin et al., "AHG9: On mixing NAL unit types in a coded picture", Joint Video Experts Team (JVET) of ITU-T SG 16 WP 3 and ISO/IEC JTC 1/SC 29/WG 11, Document: JVET:Q0396, 2020, pp. 1-6 (9 pages total).
Miska M. Hannuksela, "AHG9: On Miixed NAL unit types in a coded picture", Joint Video Experts Team (JVET) of ITU-T SG 16 WP 3 and ISO/IEC JTC 1/SC 29/WG 11, Document: JVET-Q0239, 2020, pp. 1-4 (6 pages total).
Extended European Search Report from the European Patent Office dated Dec. 22, 2023 in Application No. 209098870.
Miska M. Hannuksela, "AHG12/AHG17: On signalling of picture-specific syntax elements in access unit delimiter", Joint Video Experts Team (JVET) of ITU-T SG 16 WP 3 and ISO/IEC JTC 1/SC 29/WG 11, JVET-P0095, 16th Meeting: Geneva, CH, Oct. 1-11, 2019, pp. 1-6 (6 pages total).

\* cited by examiner

METHOD FOR MIXED NAL UNIT TYPE SUPPORT IN A CODED PICTURE

CROSS-REFERENCE TO RELATED APPLICATION

This application is a Continuation of U.S. application Ser. No. 17/077,035, filed Oct. 22, 2020, which claims priority from U.S. Provisional Application No. 62/956,254, filed on Jan. 1, 2020, the disclosures of which are incorporated herein by reference in their entireties.

FIELD

Embodiments of the present disclosure relate to video coding and decoding, and more specifically, to mixed network abstraction (NAL) unit type support for a coded picture.

BACKGROUND

In the Versatile Video Coding (VVC) specification draft JVET-P2001 (incorporated herein in its entirety) (editorially updated by JVET-Q0041), a mixed network abstraction layer (NAL) unit type feature is supported, which enable to have one or more slice NAL units with NAL unit type equal to intra random access point (IRAP) or clean random access (CRA) and one or more slice NAL units with NAL unit type equal to non-IRAP. The feature may be used for merging two different bitstreams into one or for supporting different random access periods for each local region (sub-picture). Currently, the following syntax and semantics are defined to support the functionality:

Provided below, in TABLE 1, is an example picture parameter set raw byte sequence payload (RBSP) syntax.

TABLE 1

|  | Descriptor |
|---|---|
| pic_parameter_set_rbsp( ) { | |
| ... | |
| mixed_nalu_types_in_pic_flag | u(1) |
| ... | |
| } | |

The syntax element mixed_nalu_types_in_pic_flag equal to 1 specifies that each picture referring to the picture parameter set (PPS) has more than one video coding layer (VCL) NAL unit and that the VCL NAL units do not have the same value of nal_unit_type and that the picture is not an IRAP picture. The syntax element mixed_nalu_types_in_pic_flag equal to 0 specifies that each picture referring to the PPS has one or more VCL NAL units and the VCL NAL units of each picture referring to the PPS have the same value of nal_unit_type.

When the syntax element no_mixed_nalu_types_in_pic_constraint_flag is equal to 1, the value of the syntax element mixed_nalu_types_in_pic_flag shall be equal to 0.

According to the current VVC Specification, NAL unit type codes and NAL unit type classes are defined as shown in TABLE 2 below.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RASL_NUT | Coded slice of a RASL picture slice_layer_rbsp( ) | VCL |
| 3 | RADL_NUT | Coded slice of a RADL picture slice_layer_rbsp( ) | VCL |
| 4 ... 7 | RSV_VCL_4 ... RSV_VCL_7 | Reserved non-IRAP VCL NAL unit types | VCL |
| 8<br>9 | IDR_W_RADL<br>IDR_N_LP | Coded slice of an IDR picture slice_layer_rbsp( ) | VCL |
| 10 | CRA_NUT | Coded slice of a CRA picture silce_layer_rbsp( ) | VCL |
| 11 | GDR_NUT | Coded slice of a GDR picture slice_layer_rbsp( ) | VCL |
| 12<br>13 | RSV_IRAP_VCL12<br>RSV_IRAP_VCL13 | Reserved IRAP VCL NAL unit types | VCL |
| 14 ... 15 | RSV_VCL14 ... RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |

TABLE 2-continued

| nal_unit_type | Name of nal_unit_type | Content of NAL unit and RBSP syntax structure | NAL unit type class |
|---|---|---|---|
| 24 | DPS_NUT | Decoding parameter set decoding_parameter_set_rbsp( ) | non-VCL |
| 25 ... 27 | RSV_NVCL25 ... RSV_NVCL27 | Reserved non-VCL NAL unit types | non-VCL |
| 28 ... 31 | UNSPEC28 ... UNSPEC31 | Unspecified non-VCL NAL unit types | non-VCL |

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

(A) The slice shall belong to a subpicture subpicA for which the value of the corresponding syntax element subpic_treated_as_pic_flag[i] is equal to 1.

(B) The slice shall not belong to a subpicture of picA containing VCL NAL units with the syntax element nal_unit_type not equal to nalUnitTypeA.

(C) For all the following PUs in the coded layer video sequence (CLVS) in decoding order, neither RefPicList[0] nor RefPicList[1] of a slice in subpicA shall include any picture preceding picA in decoding order in an active entry.

For VCL NAL units of any particular picture, the following applies:

If the syntax element mixed_nalu_types_in_pic_flag is equal to 0, the value of the syntax element nal_unit_type shall be the same for all coded slice NAL units of a picture. A picture or a PU is referred to as having the same NAL unit type as the coded slice NAL units of the picture or PU.

Otherwise (syntax element mixed_nalu_types_in_pic_flag is equal to 1), one or more of the VCL NAL units shall all have a particular value of nal_unit_type in the range of IDR_W_RADL to CRA_NUT, inclusive, and the other VCL NAL units shall all have a particular value of nal_unit_type in the range of TRAIL_NUT to RSV_VCL_6, inclusive, or equal to GDR_NUT.

SUMMARY

The current design of the mixed VCL NAL unit types, described in the Background section above, may have some issues.

In some cases, the picture type of a picture may be ambiguous when the picture is composed of mixed VCL NAL unit types.

In some cases, when NAL unit types are mixed in the same PU (picture), the temporal identifier (e.g., TemporalId) constraints may be conflicted.

For example, the current VVC specification has the following constraints on Temporal Id: When the syntax element nal_unit_type is in the range of IDR_W_RADL to RSV_I-RAP_12, inclusive, the syntax element TemporalId shall be equal to 0. When the syntax element nal_unit_type is equal to STSA_NUT, the syntax element TemporalId shall not be equal to 0.

In some cases, if the syntax element mixed_nalu_types_in_pic_flag is signalled in PPS, then at least two PPS NAL units shall be referred to by slice NAL units in the CLVS. Also, when a subpicture is extracted, the associated PPS shall be rewritten, by changing the value of the syntax element mixed_nalu_types_in_pic_flag.

In some cases, the current design may not support the coexistence of random access decodable leading (RADL)/random access skipped leading (RASL) NAL units with Trail pictures in a picture (PU).

In some cases, when a picture in a layer references another picture in a different layer, the syntax element mixed_nalu_types_in_pic_flag may not be aligned.

Embodiments of the present disclosure may address one or more of the issues described above and/or other issues.

According to one or more embodiments, a method performed by at least one processor is provided. The method includes: receiving a first video coding layer (VCL) network abstraction layer (NAL) unit of a first slice of a coded picture and a second VCL NAL unit of a second slice of the coded picture, the first VCL NAL unit having a first VCL NAL unit type and the second VCL NAL unit having a second VCL NAL unit type that is different from the first VCL NAL unit type; and decoding the coded picture, the decoding including determining a picture type of the coded picture based on the first VCL NAL unit type of the first VCL NAL unit and the second VCL NAL unit type of the second VCL NAL unit, or based on an indicator, received by the at least one processor, indicating that the coded picture includes different VCL NAL unit types.

According to an embodiment, the determining includes determining the coded picture is a trailing picture based on the first VCL NAL unit type indicating the first VCL NAL unit contains a trailing picture coded slice, and the second VCL NAL unit type indicating the second VCL NAL unit contains an instantaneous decoding refresh (IDR) picture coded slice or a clean random access (CRA) picture coded slice.

According to an embodiment, the determining includes determining the coded picture is a random access decodable leading (RADL) picture based on the first VCL NAL unit type indicating the first VCL NAL unit contains a RADL picture coded slice, and the second VCL NAL unit type indicating the second VCL NAL unit contains an instantaneous decoding refresh (IDR) picture coded slice or a clean random access (CRA) picture coded slice.

According to an embodiment, the determining includes determining the coded picture is a step-wise temporal sub-layer access (STSA) picture based on the first VCL NAL unit type indicating the first VCL NAL unit contains an STSA picture coded slice, and the second VCL NAL unit type indicating the second VCL NAL unit does not contain an instantaneous decoding refresh (IDR) picture coded slice.

According to an embodiment, the determining includes determining the coded picture is a trailing picture based on the first VCL NAL unit type indicating the first VCL NAL unit contains a step-wise temporal sub-layer access (STSA) picture coded slice, and the second VCL NAL unit type indicating the second VCL NAL unit does not contain a clean random access (CRA) picture coded slice.

According to an embodiment, the determining includes determining the coded picture is a trailing picture based on the first VCL NAL unit type indicating the first VCL NAL unit contains a gradual decoding refresh (GDR) picture coded slice, and the second VCL NAL unit type indicating the second VCL NAL unit does not contain an instantaneous decoding refresh (IDR) picture coded slice or a clean random access (CRA) picture coded slice.

According to an embodiment, the indicator is a flag, and the determining includes determining the coded picture is a trailing picture based on the flag indicating that the coded picture includes mixed VCL NAL unit types.

According to an embodiment, the indicator is a flag, and the decoding the coded picture further includes determining a temporal ID of the coded picture is 0 based on the flag indicating that the coded picture includes mixed VCL NAL unit types.

According to an embodiment, the indicator is a flag, and the method further includes receiving the flag in a picture header or a slice header.

According to an embodiment, the indicator is a flag, and the coded picture is in a first layer, and the method further includes receiving the flag; and determining that an additional coded picture, that is in a second layer that is a reference layer of the first layer, includes mixed VCL NAL unit types based on the flag indicating the coded picture includes mixed VCL NAL unit types.

According to one or more embodiments, a system is provided. The system includes: memory configured to store computer program code; and at least one processor configured to receive at least one coded video stream, access the computer program code, and operate as instructed by the computer program code. The computer program code including: decoding code configured to cause the at least one processor to decode a coded picture from the at least one coded video stream, the decoding code including determining code configured to cause the at least one processor to determine a picture type of the coded picture based on a first video coding layer (VCL) network abstraction layer (NAL) unit type of a first VCL NAL unit of a first slice of the coded picture, and a second VCL NAL unit type of a second VCL NAL unit of a second slice of the coded picture, or based on an indicator, received by the at least one processor, indicating that the coded picture includes mixed VCL NAL unit types, wherein the first VCL NAL unit type is different from the second VCL NAL unit type.

According to an embodiment, the determining code is configured to cause the at least one processor to determine the coded picture is a trailing picture based on the first VCL NAL unit type indicating the first VCL NAL unit contains a trailing picture coded slice, and the second VCL NAL unit type indicating the second VCL NAL unit contains an instantaneous decoding refresh (IDR) picture coded slice or a clean random access (CRA) picture coded slice.

According to an embodiment, the determining code is configured to cause the at least one processor to determine the coded picture is a random access decodable leading (RADL) picture based on the first VCL NAL unit type indicating the first VCL NAL unit contains a RADL picture coded slice, and the second VCL NAL unit type indicating the second VCL NAL unit contains an instantaneous decoding refresh (IDR) picture coded slice or a clean random access (CRA) picture coded slice.

According to an embodiment, the determining code is configured to cause the at least one processor to determine the coded picture is a step-wise temporal sub-layer access (STSA) picture based on the first VCL NAL unit type indicating the first VCL NAL unit contains an STSA picture coded slice, and the second VCL NAL unit type indicating the second VCL NAL unit does not contain an instantaneous decoding refresh (IDR) picture coded slice.

According to an embodiment, the determining code is configured to cause the at least one processor to determine the coded picture is a trailing picture based on the first VCL NAL unit type indicating the first VCL NAL unit contains a step-wise temporal sub-layer access (STSA) picture coded slice, and the second VCL NAL unit type indicating the second VCL NAL unit does not contain a clean random access (CRA) picture coded slice.

According to an embodiment, the determining code is configured to cause the at least one processor to determine the coded picture is a trailing picture based on the first VCL NAL unit type indicating the first VCL NAL unit contains a gradual decoding refresh (GDR) picture coded slice, and the second VCL NAL unit type indicating the second VCL NAL unit contains does not contain an instantaneous decoding refresh (IDR) picture coded slice or a clean random access (CRA) picture coded slice.

According to an embodiment, the indicator is a flag, and the determining code is configured to cause the at least one processor to determine the coded picture is a trailing picture based on the flag indicating that the coded picture includes mixed VCL NAL unit types.

According to an embodiment, the indicator is a flag, and the determining code is further configured to cause the at least one processor to determine that a temporal ID of the coded picture is 0 based on the flag indicating that the coded picture includes mixed VCL NAL unit types.

According to an embodiment, the indicator is a flag, and the at least one processor is configured to receive the flag in a picture header or a slice header.

According to one or more embodiments, a non-transitory computer-readable medium storing computer instructions is provided. The computer instructions, when executed by at least one processor, cause the at least one processor to: decode a coded picture from at least one coded video stream, the decoding comprising determining a picture type of the coded picture based on a first video coding layer (VCL) network abstraction layer (NAL) unit type of a first VCL NAL unit of a first slice of the coded picture, and a second VCL NAL unit type of a second VCL NAL unit of a second slice of the coded picture, or based on an indicator, received by the at least one processor, indicating that the coded picture includes mixed VCL NAL unit types, wherein the first VCL NAL unit type is different from the second VCL NAL unit type.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
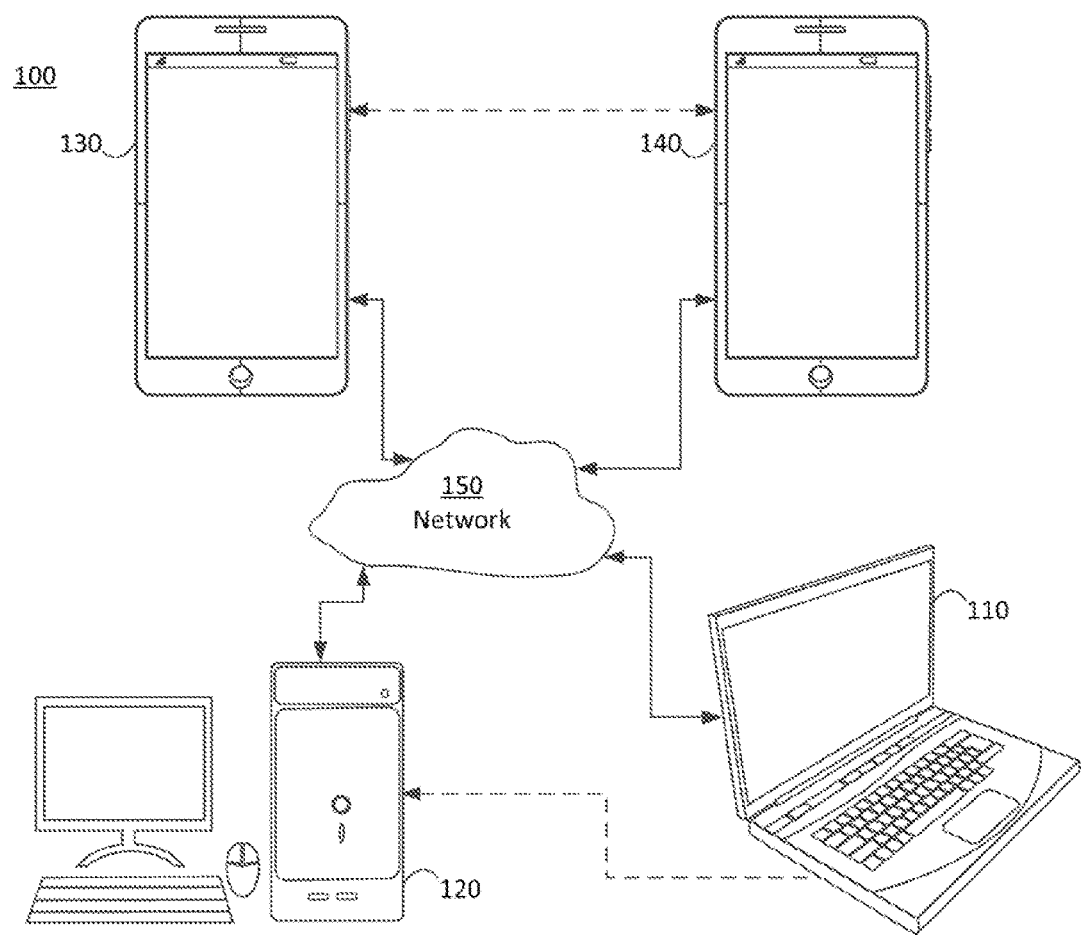
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
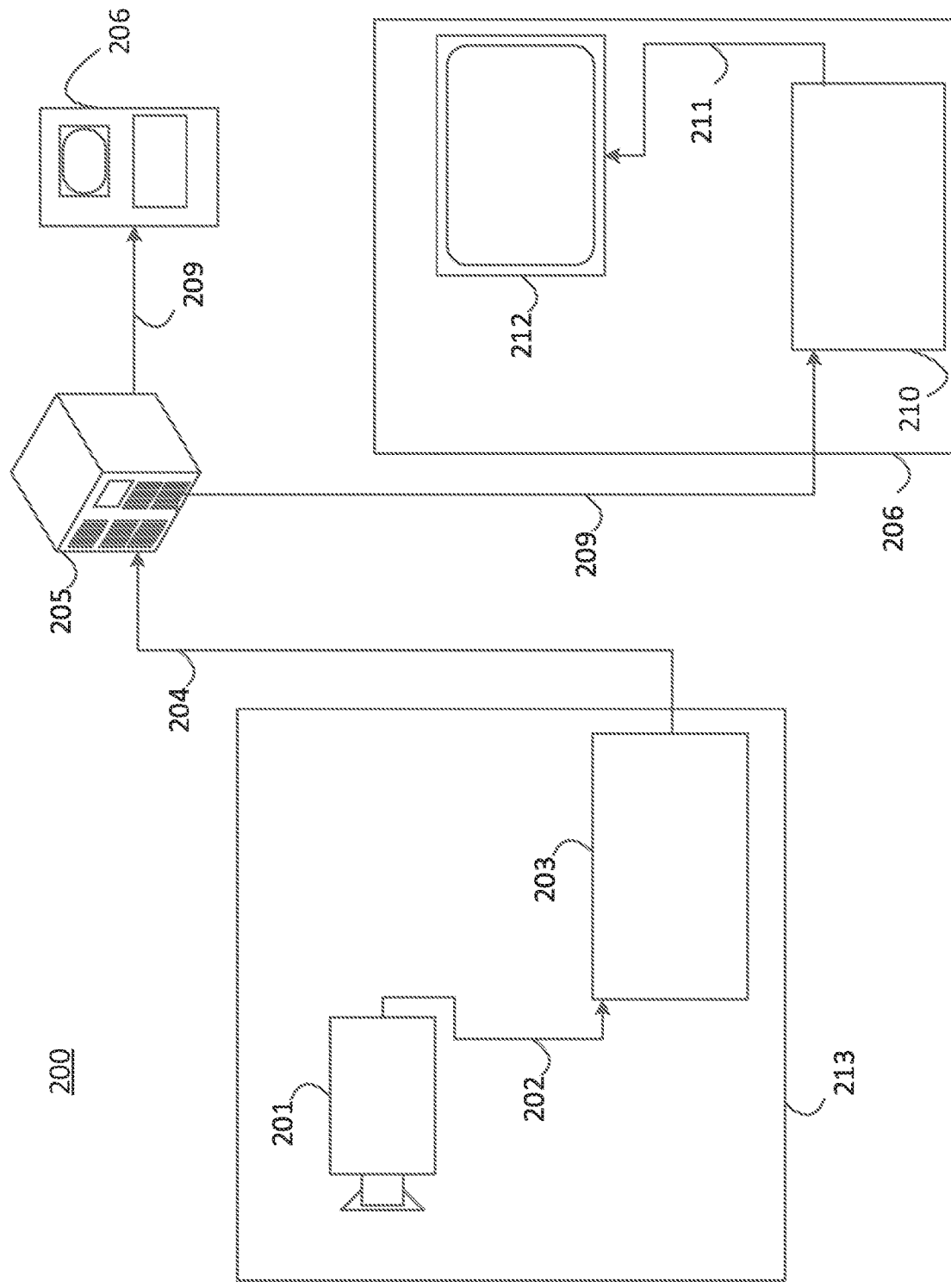
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
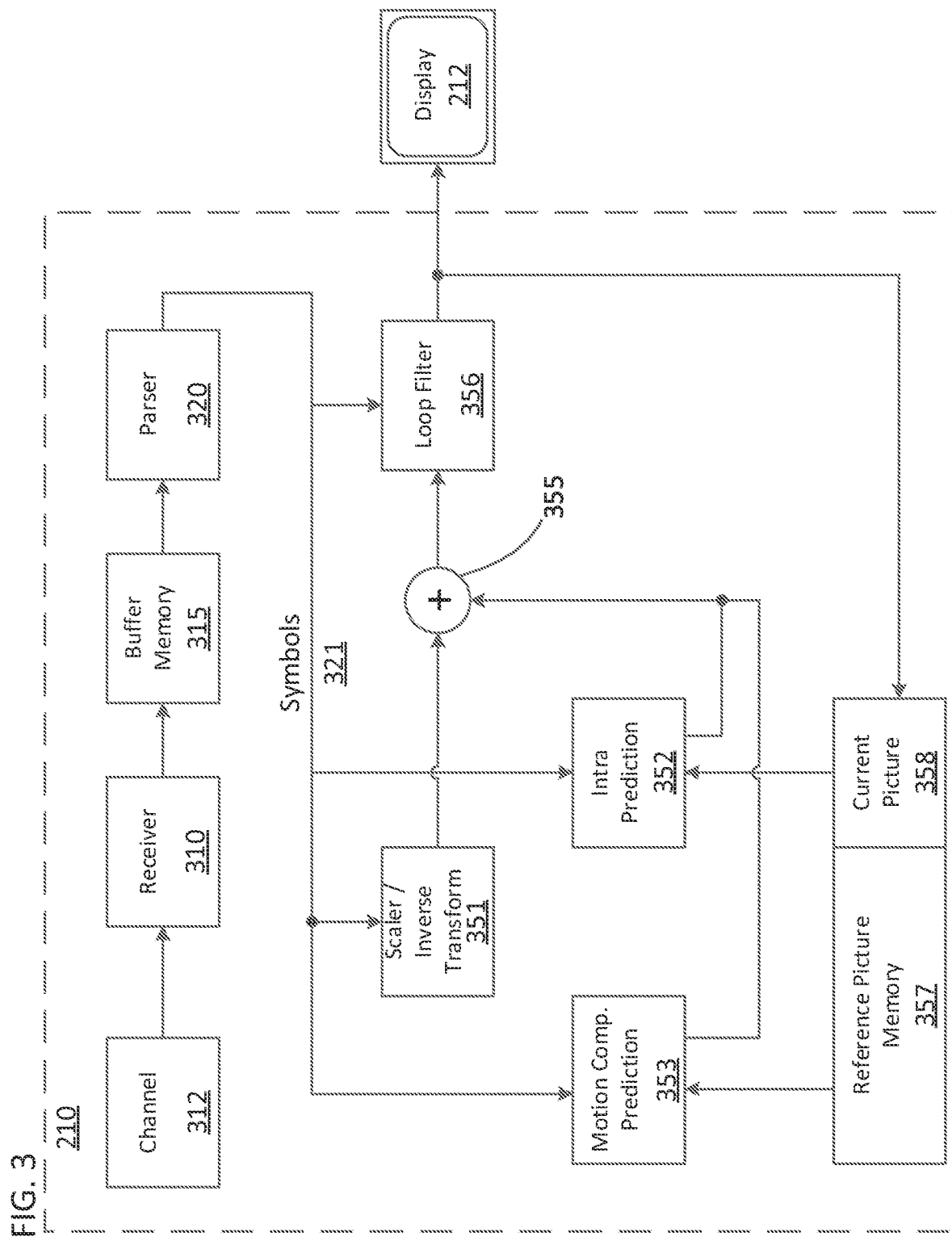
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks comprising sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
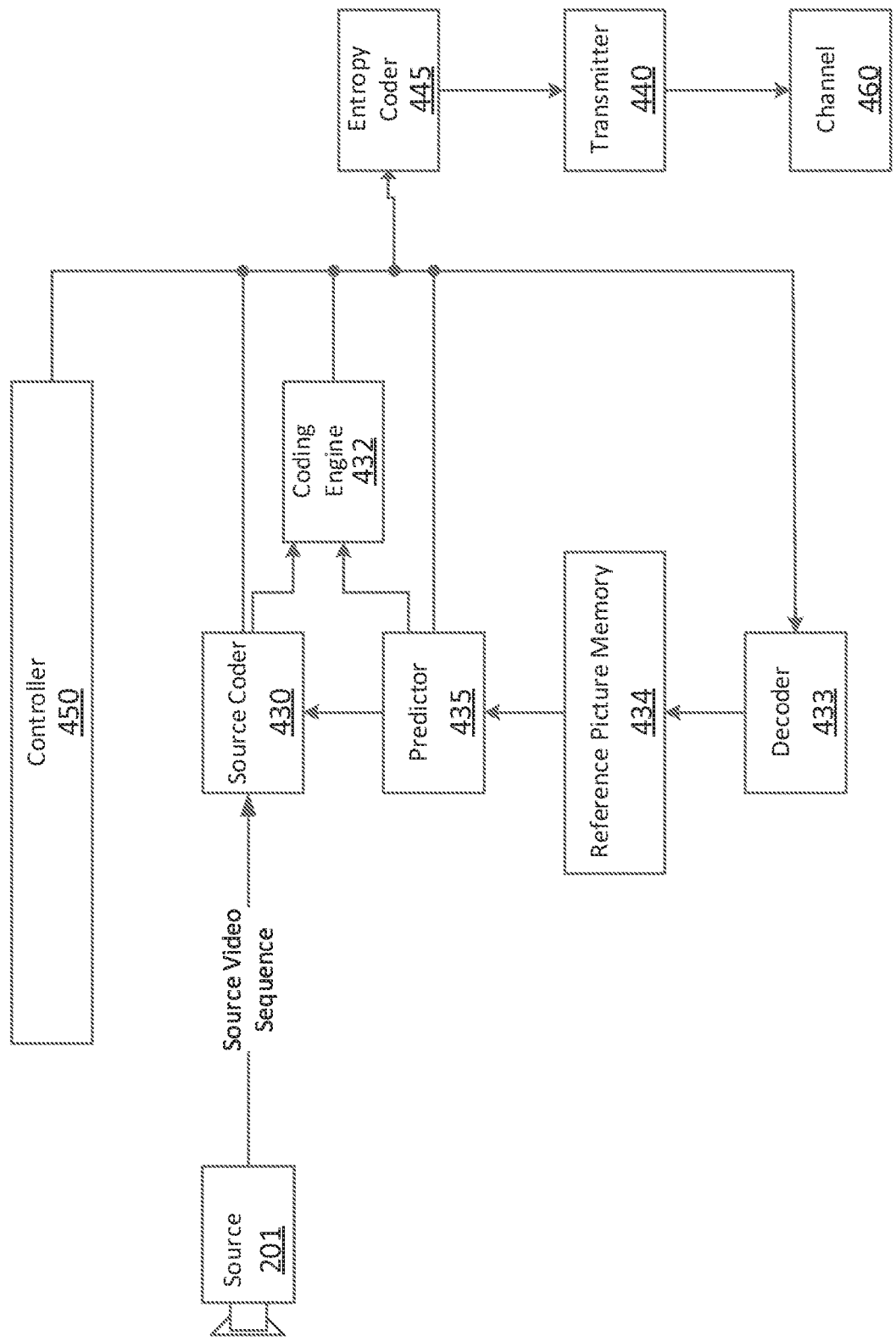
FIG. 4 is a schematic illustration of a simplified block diagram of an encoder in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop". As an oversimplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and encoding and/or decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing and/or entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example instantaneous decoding refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The embodiments of the present disclosure may modify the current VVC specification and may implement the NAL unit type codes and NAL unit type classes defined in TABLE 2 above.

An "intra random access point picture" (or "TRAP picture") may be a picture that does not refer to any pictures other than itself for inter prediction in its decoding process, and may be a clean random access (CRA) picture or an instantaneous decoding refresh (IDR) picture. The first picture in the bitstream in decoding order may be an IRAP or gradual decoding refresh (GDR) picture. Provided the necessary parameter sets are available when they need to be referred, the TRAP picture and all subsequent non-RASL pictures in the coded video sequence (CVS) in decoding order can be correctly decoded without performing the decoding process of any pictures that precede the IRAP picture in decoding order.

A "trailing picture" may be a non-TRAP picture that follows an associated TRAP picture in output order and that is not a step-wise temporal sub-layer access (STSA) picture.

A "step-wise temporal sub-layer access picture" (or "STSA picture") may be a picture that does not use pictures with the same TemporalId as the STSA picture for inter prediction reference. Pictures following an STSA picture in decoding order with the same TemporalId as the STSA picture may not use pictures prior to the STSA picture in decoding order with the same TemporalId as the STSA picture for inter prediction reference. An STSA picture may enable up-switching, at the STSA picture, to a sub-layer containing the STSA picture, from the immediately lower sub-layer. STSA pictures may have a TemporalId greater than 0.

A "random access skipped leading picture" (or "RASL picture") may be a picture that is a leading picture of an associated CRA picture. When the associated CRA picture has NoIncorrectPicOutputFlag equal to 1, the RASL picture may not output and may not be correctly decodable, as the RASL picture may contain references to pictures that are not present in the bitstream. RASL pictures may not be used as reference pictures for the decoding process of non-RASL pictures. When present, all RASL pictures may precede, in decoding order, all trailing pictures of the same associated CRA picture.

A "random access decodable leading picture" (or "RADL picture") may be a leading picture that is not used as a reference picture for a decoding process of trailing pictures of the same associated IRAP picture. When present, all RADL pictures may precede, in decoding order, all trailing pictures of the same associated IRAP picture.

An "instantaneous decoding refresh picture" (or "IDR picture") may be a picture that does not have associated leading pictures present in the bitstream (e.g. nal_unit_type equal to IDR_N_LP), or does not have associated RASL pictures present in the bitstream but may have associated RADL pictures in the bitstream (e.g. nal_unit_type equal to IDR_W_RADL).

A "clean random access picture" (or "CRA picture") may be a picture that does not refer to any pictures other than itself for inter prediction in its decoding process, and may be the first picture in the bitstream in decoding order, or may appear later in the bitstream. A CRA picture may have associated RADL or RASL pictures. When a CRA picture has NoIncorrectPicOutputFlag equal to 1, the associated RASL pictures may not be output by the decoder, because they may not be decodable, as they may contain references to pictures that are not present in the bitstream.

According to one or more embodiments, when the syntax element mixed_nalu_types_in_pic_flag of a PPS referred to by a coded picture is equal to 1, the picture type of the coded picture is determined (e.g. by the decoder) as follows:

(A) When a nal_unit_type of an NAL unit of the picture is equal to TRAIL_NUT and an nal_unit_type of another NAL unit of the picture is in the range of IDR_W_RADL to CRA_NUT, the picture is determined as a trailing picture.

(B) When a nal_unit_type of an NAL unit of the picture is equal to RADL_NUT and an nal_unit_type of another NAL unit of the picture is in the range of IDR_W_RADL to CRA_NUT, the picture is determined as a RADL picture.

(C) When a nal_unit_type of an NAL unit of the picture is equal to STSA_NUT and an nal_unit_type of another NAL unit of the picture is IDR_W_RADL or IDR_N_LP, the picture is determined as an STSA picture.

(D) When a nal_unit_type of an NAL unit of the picture is equal to STSA_NUT and an nal_unit_type of another NAL unit of the picture is CRA_NUT, the picture is determined as a trailing picture.

(E) When a nal_unit_type of an NAL unit of the picture is equal to GDR_NUT and an nal_unit_type of another NAL unit of the picture is in the range of IDR_W_RADL to CRA_NUT, the picture is determined as a trailing picture.

According to one or more embodiments, when the syntax element mixed_nalu_types_in_pic_flag of a PPS referred to by a coded picture is equal to 1, the picture type of the coded picture is determined (e.g. by a decoder) as a trailing picture.

The above aspect may provide a solution to "Problem 1" described in the Summary section above.

According to one or more embodiments, mixture of STSA NAL units with IRAP NAL units may be disallowed.

For example, for VCL NAL units of any particular picture, the following may be implemented:

If mixed_nalu_types_in_pic_flag is equal to 0, the value of nal_unit_type shall be (e.g may be determined to be) the same for all coded slice NAL units of a picture. A picture or a PU is referred to as having the same NAL unit type as the coded slice NAL units of the picture or PU.

Otherwise (mixed_nalu_types_in_pic_flag is equal to 1), one or more of the VCL NAL units shall all have (e.g. may be determined to all have) a particular value of nal_unit_type in the range of IDR_W_RADL to CRA_NUT, inclusive, and the other VCL NAL units shall all have (e.g. may be determined to all have) a particular value of nal_unit_type in the range of RADL_NUT to RSV_VCL_6, inclusive, or equal to GDR_NUT or TRAIL_NUT.

According to an embodiment, an encoder may be configured to apply the above to disallow mixture of STSA NAL units with IRAP NAL units. According to an embodiment, a decoder may be configured to determine the values of NAL unit types based on the above.

According to one or more embodiments, the TemporalId constraint on STSA_NUT of the current VVC specification draft JVET-P2001 may be removed.

That is, for example, an embodiment of the present disclosure may not implement the constraint that, when nal_unit_type is equal to STSA_NUT, TemporalId shall not be equal to 0. However, the embodiment may still implement the constraint that, when nal_unit_type is in the range of IDR_W_RADL to RSV_IRAP_12, inclusive, TemporalId shall be (e.g. may be determined to be) equal to 0.

According to one or more embodiments, a constraint that TemporalId of a picture with mixed_nalu_types_in_pic_flag equal 1 shall be equal to 0 may be implemented. For example, an encoder or a decoder of the present disclosure may determine the temporal ID of a picture to be 0 based on the flag mixed_nalu_types_in_pic_flag being equal to 1.

The above aspects may provide a solution to "Problem 2" described in the Summary section above.

According to one or more embodiments, the syntax element mixed_nalu_types_in_pic_flag may be provided in the picture header or slice header, instead of in the PPS. An example of the syntax element mixed_nalu_types_in_pic_flag in a picture header is provided in TABLE 3 below.

TABLE 3

| | Descriptor |
|---|---|
| picture_header_rbsp( ) { <br> ... <br>     mixed_nalu_types_in_pic_flag <br> ... <br> } | <br><br>u(1) |

The syntax element mixed_nalu_types_in_pic_flag equal to 1 may specify that each picture associated with the PH has more than one VCL NAL unit and that the VCL NAL units do not have the same value of nal_unit_type and that the picture is not an IRAP picture. The syntax element mixed_nalu_types_in_pic_flag equal to 0 may specify that each picture associated with the PH has one or more VCL NAL units and the VCL NAL units of each picture associated with the PH have the same value of nal_unit_type.

When the syntax element no_mixed_nalu_types_in_pic_constraint_flag is equal to 1, the value of mixed_nalu_types_in_pic_flag shall (e.g. may be determined to) be equal to 0.

According to one or more embodiments, the syntax element mixed_nalu_types_in_pic_flag may be provided in a picture header or slice header, with a present flag in SPS.

An example of an SPS with the present flag (sps_mixed_nalu_types_present_flag) is provided in TABLE 4 below.

TABLE 4

| | Descriptor |
|---|---|
| seq_parameter_set_rbsp( ) { <br> ... <br>     sps_mixed_nalu_types_present_flag <br> ... <br> } | <br><br>u(1) |

An example of a picture header with the syntax element mixed_nalu_types_in_pic_flag is provided in TABLE 5 below.

TABLE 5

| | Descriptor |
|---|---|
| picture_header_rbsp( ) { | |
| ... | |
|     if(sps_mixed_nalu_types_present_flag) | |
|         mixed_nalu_types_in_pic_flag | u(1) |
| ... | |
| } | |

The syntax element sps_mixed_nalu_types_present_flag equal to 1 may specify that zero or more picture referring to the SPS has more than one VCL NAL unit and that the VCL NAL units do not have the same value of nal_unit_type and that the picture is not an IRAP picture. The syntax element sps_mixed_nalu_types_present_flag equal to 0 may specify that each picture referring to the SPS has one or more VCL NAL units and the VCL NAL units of each picture referring to the PPS have the same value of nal_unit_type.

When the syntax element no_mixed_nalu_types_in_pic_constraint_flag is equal to 1, the value of the syntax element sps_mixed_nalu_types_present_flag shall be (e.g. may be determined to be) equal to 0.

The syntax element mixed_nalu_types_in_pic_flag equal to 1 may specify that each picture associated with the PH has more than one VCL NAL unit and that the VCL NAL units do not have the same value of nal_unit_type and that the picture is not an IRAP picture. The syntax element mixed_nalu_types_in_pic_flag equal to 0 may specify that each picture associated with the PH has one or more VCL NAL units and the VCL NAL units of each picture associated with the PH have the same value of nal_unit_type. When not present, the value of mixed_nalu_types_in_pic_flag may be inferred (e.g. by a decoder) to be equal to 0.

The above aspects may provide a solution to "Problem 3" described in the Summary section above.

According to one or more embodiments, the syntax element flag mixed_nalu_types_in_pic_flag may be replaced with an indicator mixed_nalu_types_in_pic_idc.

An example of a picture parameter set with the syntax element mixed_nalu_types_in_pic_idc is provided in TABLE 6 below.

TABLE 6

| | Descriptor |
|---|---|
| pic_parameter_set_rbsp( ) { | |
| ... | |
|     mixed_nalu_types_in_pic_idc | u(2) |
| ... | |
| } | |

The syntax element mixed_nalu_types_in_pic_idc equal to 1 or 2 may specify that each picture referring to the PPS has more than one VCL NAL unit and that the VCL NAL units do not have the same value of nal_unit_type and that the picture is not an IRAP picture. The syntax element mixed_nalu_types_in_pic_idc equal to 0 may specify that each picture referring to the PPS has one or more VCL NAL units and the VCL NAL units of each picture referring to the PPS have the same value of nal_unit_type. Other values for the syntax element mixed_nalu_types_in_pic_idc may be reserved for future use by ITU-T ISO/IEC.

When the syntax element no_mixed_nalu_types_in_pic_constraint_idc is equal to 1, the value of mixed_nalu_types_in_pic_idc shall be (e.g. determined to be by, for example, a decoder to) equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_idc for the picture picA is equal to 1), the following may be implemented:

(A) The slice shall belong (e.g. may be determined to belong) to a subpicture subpicA for which the value of the corresponding subpic_treated_as_pic_flag[i] is equal to 1.

(B) The slice shall not belong (e.g. may be determined to not belong) to a subpicture of picA containing VCL NAL units with nal_unit_type not equal to nalUnitTypeA.

(C) For all the following PUs in the CLVS in decoding order, neither RefPicList[0] nor RefPicList[1] of a slice in subpicA shall include any picture preceding picA in decoding order in an active entry.

RefPicList[0] may be the reference picture list used for inter prediction of a P slice or the first reference picture list used for inter prediction of a B slice. RefPicList[1] may be the second reference picture list used for inter prediction of a B slice.

For VCL NAL units of any particular picture, the following may be implemented:

(A) If the syntax element mixed_nalu_types_in_pic_idc is equal to 1, one or more of the VCL NAL units shall all have (e.g. may be determined to have) a particular value of nal_unit_type in the range of IDR_W_RADL to CRA_NUT, inclusive, and the other VCL NAL units shall all have (e.g. may be determined to have) a particular value of nal_unit_type in the range of TRAIL_NUT to RSV_VCL_6, inclusive, or equal to GDR_NUT.

(B) If the syntax element mixed_nalu_types_in_pic_idc is equal to 2, one or more of the VCL NAL units shall all have (e.g. may be determined to have) a particular value of nal_unit_type equal to RASL_NUT or RADL_NUT, inclusive, or equal to GDR_NUT, and the other VCL NAL units shall all have (e.g. may be determined to have) a particular value of nal_unit_type in the range of TRAIL_NUT to RSV_VCL_6, inclusive, or equal to GDR_NUT, where the nal_unit_type is different than the other nal_unit_type.

(C) Otherwise (mixed_nalu_types_in_pic_idc is equal to 0), the value of nal_unit_type shall be (e.g. may be determined to be) the same for all coded slice NAL units of a picture. A picture or a PU is referred to as having the same NAL unit type as the coded slice NAL units of the picture or PU.

When mixed_nalu_types_in_pic_idc of a PPS referred to by a coded picture is equal to 1 or 2, the picture may be determined (e.g. by a decoder) to be a trailing picture.

The above aspects may provide a solution to "Problem 4" described in the Summary section above.

According to one or more embodiments, when the syntax element mixed_nalu_types_in_pic_flag of a picture in a layer A is equal to 1, mixed_nalu_types_in_pic_flag of a picture in a layer B, which is a reference layer of the layer A, shall be (e.g. may be determined to be) equal to 1 in the same AU.

The above aspect may provide a solution to "Problem 5" described in the Summary section above.

Figure 5:
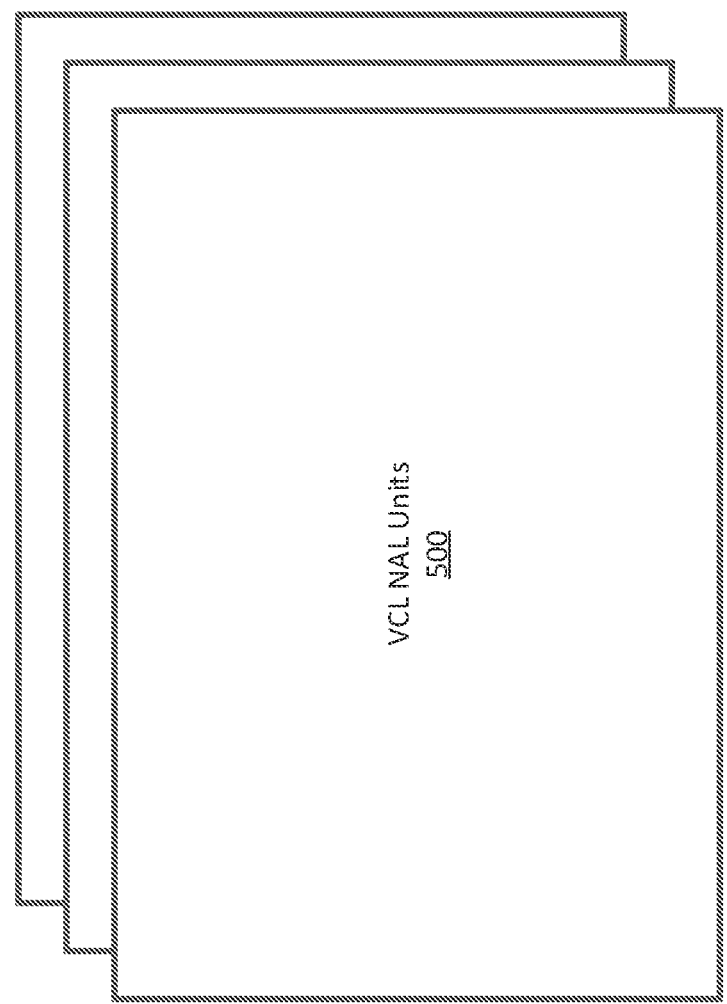
FIG. 5 is a block diagram of NAL units according to an embodiment.

According to one or more embodiments, one or more coded video data bitstreams, and the syntax structures and elements therein (such as the VCL NAL units and parameter sets described above), may be received by decoders of the present disclosure for decoding received video data. The decoders of the present disclosure may decode a coded picture of a video, based on VCL NAL units (e.g. VCL NAL units (500) illustrated in FIG. 5) of the coded picture that have mixed VCL NAL unit types, in accordance with embodiments of the present disclosure.

Figure 6:
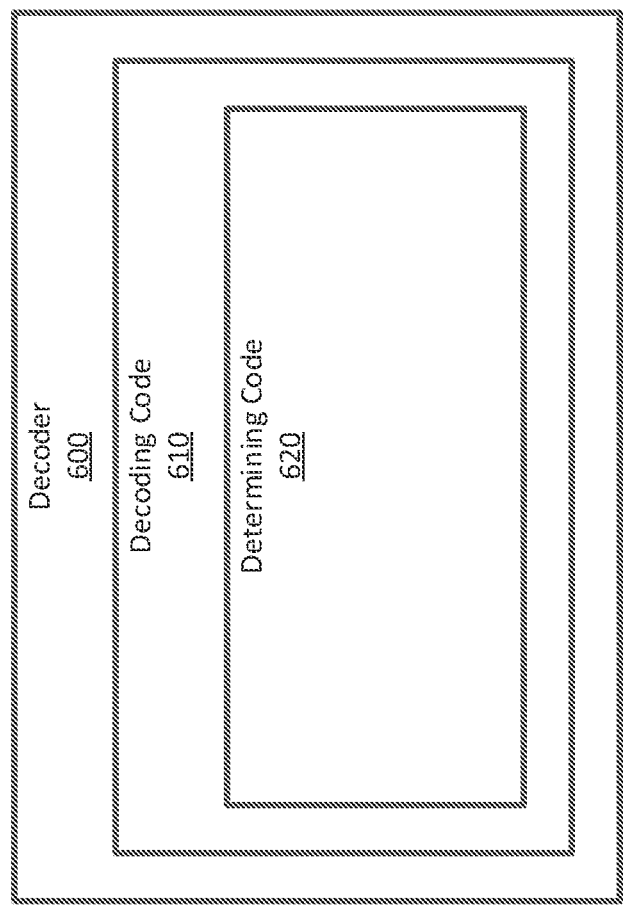
FIG. 6 is a block diagram of a decoder according to an embodiment.

For example, with reference to FIG. 6, a decoder (600) may comprise decoding code (610) configured to cause at least one processor of the decoder (600) to decode the coded picture based on the VCL NAL units. According to one or more embodiments, the decoding code (610) may comprise determining code (620) configured to cause the at least one processor of the decoder (600) to, as described in embodiments of the present disclosure, (a) determine or constrain an NAL unit type of one or more VCL NAL units of the coded picture based on an NAL unit type of another one or more VCL NAL units of the coded picture or based on an indicator (e.g. a flag), (b) determine or constrain a picture type of the coded picture based on one or more NAL unit types of VCL NAL units of the coded picture or based on an indicator (e.g. a flag), (c) determine or constrain a TemporalID of the coded picture based on one or more NAL unit types of one or more VCL NAL units of the coded picture or based on an indicator (e.g. a flag), and/or (d) determine or constrain an indicator (e.g. a flag) that indicates whether the coded picture has a plurality of VCL NAL units that have mixed VCL NAL unit types based on another indicator (e.g. a flag) that is received or determined.

The embodiments of the present disclosure may be used separately or combined in any order. Further, each of the methods, encoders, and decoders of the present disclosure may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 7 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
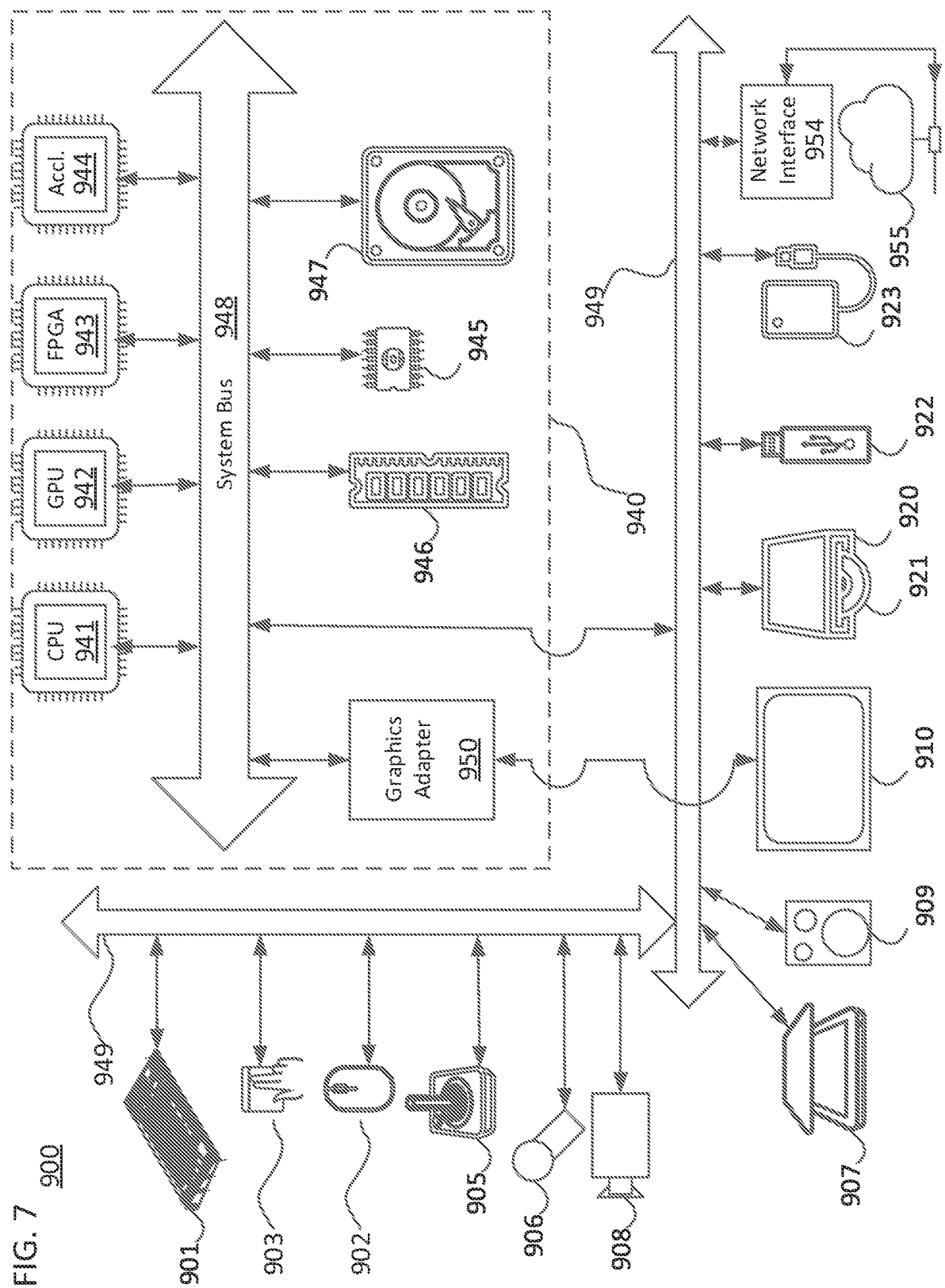
FIG. 7 is a diagram of a computer system suitable for implementing embodiments.

The components shown in FIG. 7 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter 950 may be included in the core 940.

CPUs (941), GPUs (942), FPGAs (943), and accelerators (944) can execute certain instructions that, in combination, can make up the aforementioned computer code. That computer code can be stored in ROM (945) or RAM (946). Transitional data can be also stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
   receiving a first video coding layer (VCL) network abstraction layer (NAL) unit of a first slice of a coded picture and a second VCL NAL unit of a second slice of the coded picture, the first VCL NAL unit having a first VCL NAL unit type and the second VCL NAL unit having a second VCL NAL unit type that is different from the first VCL NAL unit type; and
   decoding the coded picture, the decoding comprising determining a picture type of the coded picture based on:
   a first "nal_unit_type" syntax element that indicates the first VCL NAL unit type of the first VCL NAL unit of the coded picture, and a second "nal_unit_type" syntax element that indicates the second VCL NAL unit type of the second VCL NAL unit of the coded picture, wherein the first "nal_unit_type" syntax element and the second "nal_unit_type" syntax element have different values from each other, or
   an indicator, received by the at least one processor, indicating that the coded picture includes VCL NAL units that respectively have "nal_unit_type" syntax elements with different values from each other.

2. The method of claim 1, wherein
the determining comprises determining the coded picture is a trailing picture based on the first "nal_unit_type" syntax element indicating the first VCL NAL unit contains a trailing picture coded slice, and the second "nal_unit_type" syntax element indicating the second VCL NAL unit contains an instantaneous decoding refresh (IDR) picture coded slice or a clean random access (CRA) picture coded slice.

3. The method of claim 1, wherein
the determining comprises determining the coded picture is a random access decodable leading (RADL) picture based on the first "nal_unit_type" syntax element indicating the first VCL NAL unit contains a RADL picture coded slice, and the second "nal_unit_type" syntax element indicating the second VCL NAL unit contains an instantaneous decoding refresh (IDR) picture coded slice or a clean random access (CRA) picture coded slice.

4. The method of claim 1, wherein
the determining comprises determining the coded picture is a step-wise temporal sub-layer access (STSA) picture based on the first "nal_unit_type" syntax element indicating the first VCL NAL unit contains an STSA picture coded slice, and the second "nal_unit_type" syntax element indicating the second VCL NAL unit does not contain an instantaneous decoding refresh (IDR) picture coded slice.

5. The method of claim 1, wherein
the determining comprises determining the coded picture is a trailing picture based on the first "nal_unit_type"

syntax element indicating the first VCL NAL unit contains a step-wise temporal sub-layer access (STSA) picture coded slice, and the second "nal_unit_type" syntax element indicating the second VCL NAL unit does not contain a clean random access (CRA) picture coded slice.

6. The method of claim 1, wherein
the determining comprises determining the coded picture is a trailing picture based on the first "nal_unit_type" syntax element indicating the first VCL NAL unit contains a gradual decoding refresh (GDR) picture coded slice, and the second "nal_unit_type" syntax element indicating the second VCL NAL unit contains does not contain an instantaneous decoding refresh (IDR) picture coded slice or a clean random access (CRA) picture coded slice.

7. The method of claim 1, wherein
the indicator is a flag, and
the determining comprises determining the coded picture is a trailing picture based on the flag indicating that the coded picture includes VCL NAL units that respectively have "nal_unit_type" syntax elements with different values from each other.

8. The method of claim 1, wherein
the indicator is a flag, and
the decoding the coded picture further comprises determining a temporal ID of the coded picture is 0 based on the flag indicating that the coded picture includes VCL NAL units that respectively have "nal_unit_type" syntax elements with different values from each other.

9. The method of claim 1, wherein,
the indicator is a flag, and
the method further comprises receiving the flag in a picture header or a slice header.

10. The method of claim 1, wherein,
the indicator is a flag, and the coded picture is in a first layer, and
the method further comprises:
receiving the flag; and
determining that an additional coded picture, that is in a second layer that is a reference layer of the first layer, includes VCL NAL units that respectively have "nal_unit_type" syntax elements with different values from each other based on the flag indicating the coded picture includes VCL NAL units that respectively have "nal_unit_type" syntax elements with different values from each other.

11. A system comprising:
memory configured to store computer program code; and
at least one processor configured to receive at least one coded video stream, access the computer program code, and operate as instructed by the computer program code, the computer program code comprising:
decoding code configured to cause the at least one processor to decode a coded picture from the at least one coded video stream, the decoding code comprising determining code configured to cause the at least one processor to determine a picture type of the coded picture based on:
a first "nal_unit_type" syntax element that indicates a first video coding layer (VCL) network abstraction layer (NAL) unit type of a first VCL NAL unit of a first slice of the coded picture, and a second "nal_unit_type" syntax element that indicates a second VCL NAL unit type of a second VCL NAL unit of a second slice of the coded picture, wherein the first "nal_unit_type" syntax element and the second "nal_unit_type" syntax element have different values from each other, or
an indicator, received by the at least one processor, indicating that the coded picture includes VCL NAL units that respectively have "nal_unit_type" syntax elements with different values from each other,
wherein the first VCL NAL unit type is different from the second VCL NAL unit type.

12. The system of claim 11, wherein
the determining code is configured to cause the at least one processor to determine the coded picture is a trailing picture based on the first "nal_unit_type" syntax element indicating the first VCL NAL unit contains a trailing picture coded slice, and the second "nal_unit_type" syntax element indicating the second VCL NAL unit contains an instantaneous decoding refresh (IDR) picture coded slice or a clean random access (CRA) picture coded slice.

13. The system of claim 11, wherein
the determining code is configured to cause the at least one processor to determine the coded picture is a random access decodable leading (RADL) picture based on the first "nal_unit_type" syntax element indicating the first VCL NAL unit contains a RADL picture coded slice, and the second "nal_unit_type" syntax element indicating the second VCL NAL unit contains an instantaneous decoding refresh (IDR) picture coded slice or a clean random access (CRA) picture coded slice.

14. The system of claim 11, wherein
the determining code is configured to cause the at least one processor to determine the coded picture is a step-wise temporal sub-layer access (STSA) picture based on the first "nal_unit_type" syntax element indicating the first VCL NAL unit contains an STSA picture coded slice, and the second "nal_unit_type" syntax element indicating the second VCL NAL unit does not contain an instantaneous decoding refresh (IDR) picture coded slice.

15. The system of claim 11, wherein
the determining code is configured to cause the at least one processor to determine the coded picture is a trailing picture based on the first "nal_unit_type" syntax element indicating the first VCL NAL unit contains a step-wise temporal sub-layer access (STSA) picture coded slice, and the second "nal_unit_type" syntax element indicating the second VCL NAL unit does not contain a clean random access (CRA) picture coded slice.

16. The system of claim 11, wherein
the determining code is configured to cause the at least one processor to determine the coded picture is a trailing picture based on the first "nal_unit_type" syntax element indicating the first VCL NAL unit contains a gradual decoding refresh (GDR) picture coded slice, and the second "nal_unit_type" syntax element indicating the second VCL NAL unit does not contain an instantaneous decoding refresh (IDR) picture coded slice or a clean random access (CRA) picture coded slice.

17. The system of claim 11, wherein
the indicator is a flag, and
the determining code is configured to cause the at least one processor to determine the coded picture is a trailing picture based on the flag indicating that the coded picture includes VCL NAL units that respectively have "nal_unit_type" syntax elements with different values from each other.

18. The system of claim 11, wherein
the indicator is a flag, and
the determining code is further configured to cause the at least one processor to determine that a temporal ID of the coded picture is 0 based on the flag indicating that the coded picture includes VCL NAL units that respectively have "nal_unit_type" syntax elements with different values from each other.

19. The system of claim 11, wherein,
the indicator is a flag, and
the at least one processor is configured to receive the flag in a picture header or a slice header.

20. A non-transitory computer-readable medium storing computer instructions that, when executed by at least one processor, cause the at least one processor to:

decode a coded picture from at least one coded video stream, the decoding comprising determining a picture type of the coded picture based on:

a first "nal_unit_type" syntax element that indicates a first video coding layer (VCL) network abstraction layer (NAL) unit type of a first VCL NAL unit of a first slice of the coded picture, and a second "nal_unit_type" syntax element that indicates a second VCL NAL unit type of a second VCL NAL unit of a second slice of the coded picture, wherein the first "nal_unit_type" syntax element and the second "nal_unit_type" syntax element have different values from each other, or an indicator, received by the at least one processor, indicating that the coded picture includes VCL NAL units that respectively have "nal_unit_type" syntax elements with different values from each other, wherein the first VCL NAL unit type is different from the second VCL NAL unit type.

* * * * *